May 31, 1938.

D. J. LANE 2,119,108

CONTROL SYSTEM

Filed Oct. 29, 1934

INVENTOR.
DANIEL J. LANE
BY
ATTORNEY.

May 31, 1938.  D. J. LANE  2,119,108
CONTROL SYSTEM
Filed Oct. 29, 1934  3 Sheets-Sheet 2
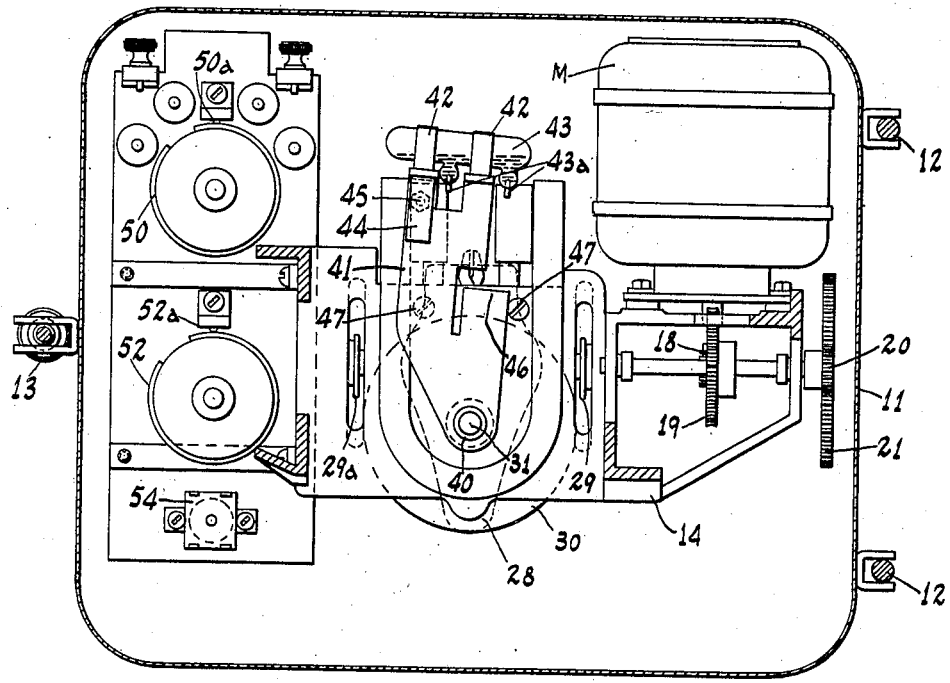
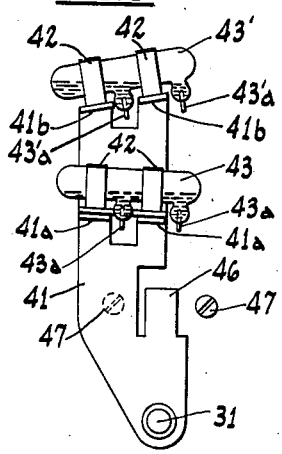
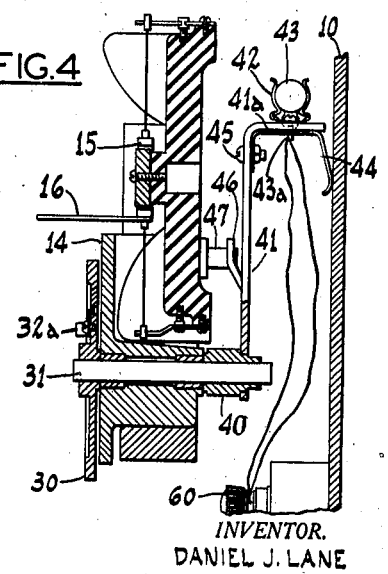
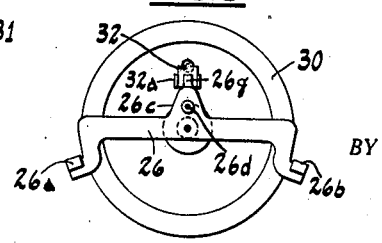
INVENTOR.
DANIEL J. LANE
BY
ATTORNEY.

May 31, 1938.                    D. J. LANE                    2,119,108
                              CONTROL SYSTEM
                           Filed Oct. 29, 1934            3 Sheets-Sheet 3
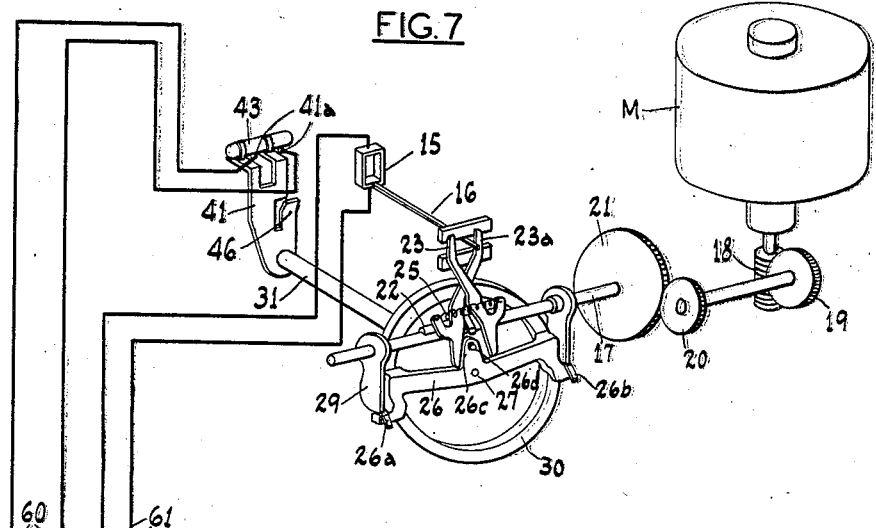
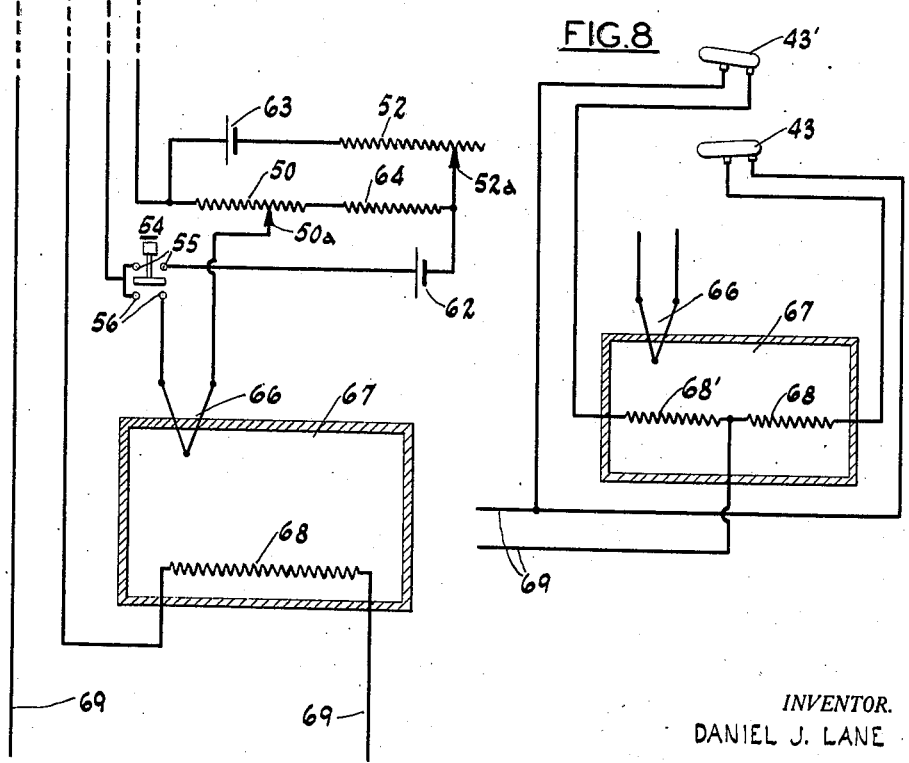
INVENTOR.
DANIEL J. LANE
BY
*Cornelius L. Ehret*
ATTORNEY.

Patented May 31, 1938

2,119,108

UNITED STATES PATENT OFFICE 2,119,108

CONTROL SYSTEM

Daniel J. Lane, Wyndmoor, Pa., assignor to Leeds & Northrup Company, Philadelphia, Pa., a corporation of Pennsylvania Application October 29, 1934, Serial No. 750,453

7 Claims. (Cl. 236—70)

My invention relates to control systems and more particularly to such systems in which changes in magnitude of a condition to be controlled are integrated and a controlling effect or impulse is applied to modify the condition only in response to a predetermined integrated change or departure of the condition from some predetermined value or variation characteristic.

More particularly, my invention relates to an electrical control system in which there is produced an electrical effect which is a measure of a condition to be controlled; in which this effect is continuously measured and mechanically integrated, and in which there is produced a control impulse, for example, the closing of contacts in an electric circuit, only in response to a predetermined integrated departure of the condition from a desired constant or variable value. Such a system has the advantages of extreme simplicity without sacrifice in accuracy, since the average of the condition under control is maintained at the desired value with a high degree of accuracy.

In accordance with one embodiment of my invention, there is produced an electrical effect varying in accordance with the condition to be controlled, and this electrical effect is continuously measured. Mechanical integrating mechanism intermittently produces a displacement of a driven member dependent only upon the instantaneous magnitude of the electrical effect, which is a measure of the condition to be controlled, and the resultant movements of this driven member add algebraically to give a measure of the integrated change or departure of the condition from the desired value.

My invention is particularly characterized by the fact the measuring element, as a galvanometer pointer, deflects from a neutral position in accord with departure of the condition from its predetermined or desired value and remains in the deflected position as long as any departure of said condition exists. Only when the magnitude of the condition is restored to its predetermined value is the deflecting element restored to its neutral position. In consequence the driven member is periodically operated in accord with the aforesaid departure as contrasted with prior systems in which the driven member operates a slidewire or equivalent device to rebalance the measuring circuit to return the deflecting member to its neutral position irrespective of then existing departure of the condition from its predetermined value.

A control device is operated by the driven member and is effective to give a controlling impulse only in response to a predetermined movement of the driven member corresponding to a predetermined integrated change in the condition. The control of the condition is preferably effected solely in response to such control effects or impulses.

In the preferred embodiment of my invention, the electrical effect constituting a measure of the condition to be controlled is mechanically integrated by a mechanism similar to that disclosed and claimed in United States Letters Patent No. 1,935,732, granted November 21, 1933, upon the application of L. Y. Squibb, while the control device constitutes a mercury switch operated by such an integrating mechanism and included in a circuit constituting the sole control of the condition in question.

It will be apparent to those skilled in the art that any desired primary condition capable of being measured, and particularly one from which an electrical measuring effect may be derived, may be controlled by the improved system of my invention. Well-known examples of such condition are temperature, pressure, current, voltage, frequency, or other electrical condition of an electric circuit, rate of flow, and the like.

For a better understanding of my invention, together with other and further features thereof, reference is had to the following description, taken in connection with the accompanying drawings, and its scope will be pointed out in the appended claims.

In the drawings, Fig. 1 is a view in front elevation of a control apparatus suitable for use in my improved control system, with the electrical measuring instrument removed for the sake of clarity.

Fig. 3 is a rear elevation of the apparatus of Fig. 1, partly in section, being taken along the lines 3—3 of Fig. 2;

Fig. 4 illustrates in detail the mounting of the control switch of the apparatus of Fig. 1, partly in cross-section;

Fig. 5 is a detail of the driving and driven clutch members of the integrating mechanism of Fig. 1;

Fig. 6 is a rear elevation of a modified control switch structure;

Fig. 7 is a diagram of a complete control system utilizing the apparatus of Figs. 1 to 5; while Fig. 8 is a diagram of a portion of the control system of Fig. 7 modified for utilization of the control switch structure of Fig. 6.

Figure 1:
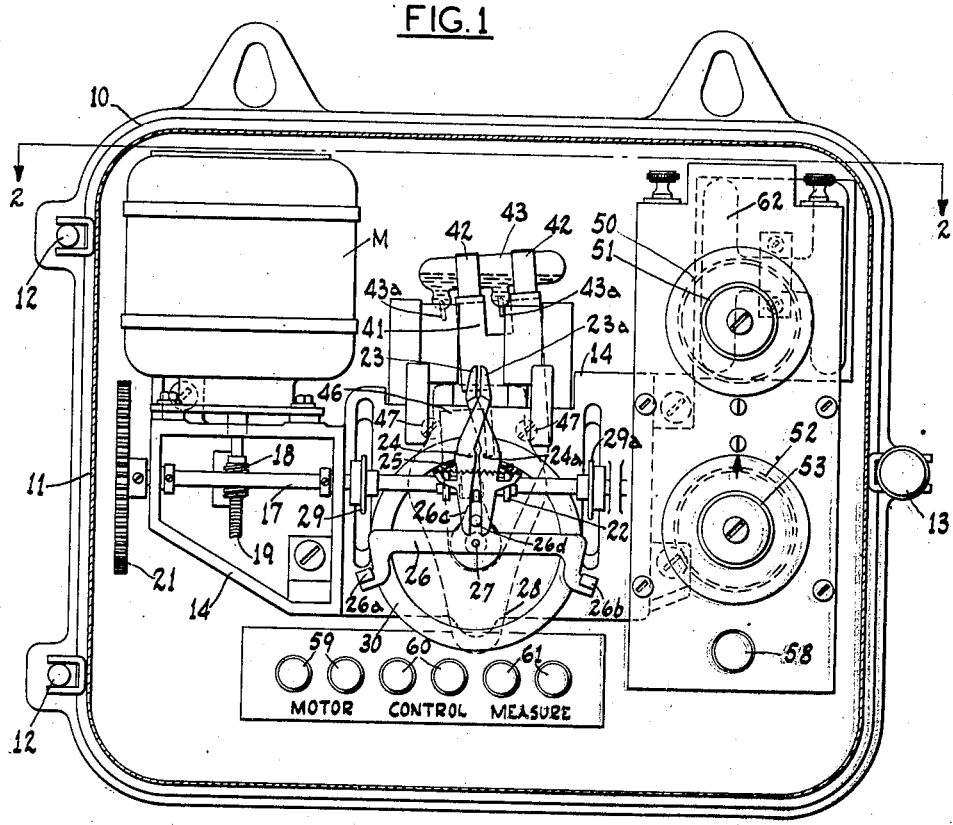
Figure 2:
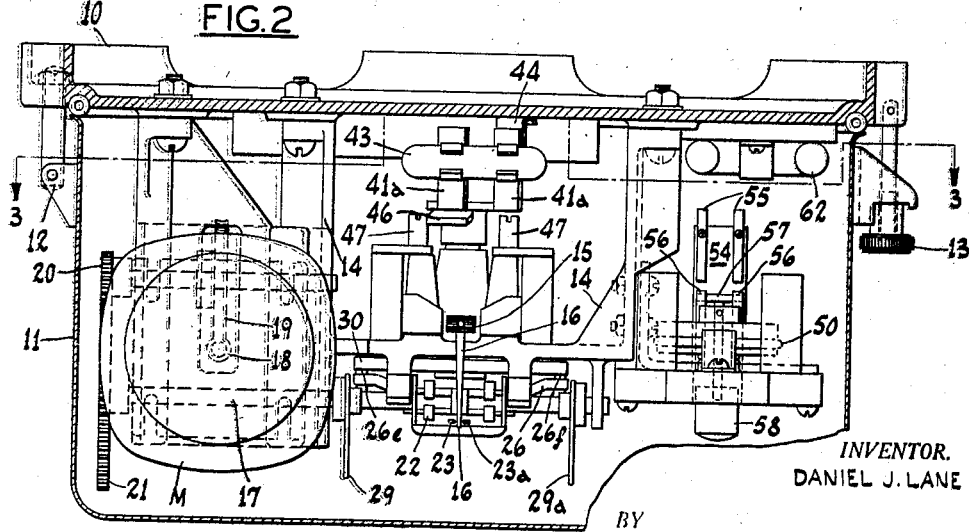
Fig. 2 is a top plan view of the apparatus of Fig. 1, including the electrical measuring instrument, shown partly in section, being taken along the lines 2—2 of Fig. 1.

Referring now more particularly to Figs. 1 to 4 of the drawings, there is illustrated a control apparatus similar to that described in the above-mentioned Squibb patent, to which reference is made for a detailed description. In brief, this apparatus comprises a base or panel 10 provided with an extending cover 11 pivotally supported from the base 10 at 12, and adapted to be retained in closed position by thumb screw 13. Secured to the base 10 is a composite frame 14 from which are supported the several elements of the mechanism. The measuring instrument comprises a galvanometer 15 of any conventional type, provided with a pointer or deflecting member 16 and preferably being detachably supported as a unit from the frame 14.

The mechanical integrating mechanism is driven by a continuously rotating shaft 17 operated by a motor M through any suitable gearing, such as a worm 18 and a worm-wheel 19, and the spur gears 20 and 21, the worm 18 being connected to the motor M and the gear 21 to the shaft 17. Secured to the shaft 17 is a cam structure 22 provided with a plurality of cam elements or surfaces for operating the several elements to be described. The integrating mechanism includes a pair of scissors-like members 23 and 23a pivotally supported at 24 and 24a, respectively, and biased into closed position by a spring 25 interconnecting them. These elements 23 and 23a are intermittently separated and released by an element of the cam 22 and, when released, are disposed to engage the projecting needle 16 of the galvanometer 15 which, during the engaging portion of the cycle of operation, is clamped by a mechanism (not shown) operated by the cam 22. The integrating mechanism includes, also a clutch member 26 pivotally mounted at 27 on a member 28, shown in dotted outline for the sake of clarity. The member 26 has an upstanding arm 26c from which projects a pin 26d disposed to be engaged by the lower arms of the elements 23 and 23a when released by the cam 22, the spring 25 being effective, while returning the elements 23 to closed position, to move the member 26 about its pivot 27 through an angle varying with the deflection of the needle 16.

Extending from the outer ends of the member 26 are cam surfaces 26a and 26b disposed in the path of the cams 29 and 29a, respectively, secured to the continuously rotating shaft 17. The member 26 is provided with a pair of clutch elements or shoes 26e and 26f cooperating with a clutch disk 30 rigidly secured to a shaft 31, Figs. 3, 4 and 7, journalled in the frame 14. The member 28, together with the clutch member 26 carried thereby, is pivotally supported in the frame 14 and intermittently moved away from the disk 30 to disengage the clutch shoes 26e and 26f during that portion of the cycle of operation in which the engaging elements 23 and 23a are released by cam 22.

The operation of the above-described mechanical integrating mechanism will also be found described in detail in the above-mentioned Squibb patent. In brief, assuming that the galvanometer needle 16 has deflected in response to a change in a condition to be controlled, the engaging elements 23 and 23a are separated by the cam 22 to allow the needle 16 to take up its deflected position. Thereupon, one clamping element is operated by the cam 22, to clamp the needle between it and a second clamping element and shortly thereafter, to release the engaging elements 23, 23a. These elements tend to return to their neutral position, shown in Fig. 1, but if the needle has been deflected, as just described, one of the elements will engage the needle before reaching the neutral position, and the spring 25 will be effective to close the scissors, bringing the other element also into engagement with the needle 16. The closing of the scissors effects a corresponding movement of the pin 26d and rotation of the clutch member 26 about its pivot 27, during this portion of the cycle the clutch member 26 being disengaged from the clutch disk 30. Thereupon, the cam 22 again separates the engaging elements 23 and 23a, releases the clutch member 26 to reengage the clutch disk 30, and simultaneously releases the means clamping the galvanometer needle 16. Upon reengagement of the clutch member 26 and disk 30, the cams 29 and 29a engage that one of the cam surfaces 26a, 26b of the clutch member 26 which has been deflected by the above-described movement towards the shaft 17. The cams 29, 29a are thus effective to restore the clutch member 26 to its neutral position and simultaneously to turn the clutch disk 30 and the shaft 31 through an angle which is a measure of the deflection of the galvanometer needle 16 for the particular cycle of operation. The above-described cycle is repeated, each rotation of the shaft 17 producing a rotation of the shaft 31 by an increment or step which is a measure of the instantaneous deflection of the galvanometer needle 16, these incremental or step-by-step movements of the shaft 31 being added algebraically to produce an angular movement which is a measure of the integrated change in the condition measured by the galvanometer 15.

The control switch assembly, operated by the above-described integrating mechanism, is supported from a hub 40, Figs. 3 and 4, secured to the rear of the shaft 31 and comprises a bracket or support 41 fixed to the hub 40 and provided with a pair of arms 41a projecting horizontally therefrom. Secured to the arms 41a, Figs. 6 and 7, are spring clips 42 in which is mounted a mercury switch 43 provided with terminals 43a. A frictional drag element 44, secured to the bracket 41 as by a bolt 45, engages the base 10 or other portion of the stationary structure to retain the switch assembly in the position to which it is operated by the integrating mechanism. Movement of the switch assembly may be maintained within the limits necessary for effecting opening and closing of the circuit including the switch terminals by a projecting arm 46 cooperating with a pair of studs 47 secured to a portion of the stationary frame. While the cooperating stops 46 and 47 prevent movement of the switch assembly beyond the required limits, the above-described integrating mechanism, if tending to move the switch assembly beyond these limits, would produce a slipping between the clutch disk 30 and the clutch shoes 26e and 26f. To avoid this, a stop member 32 (Fig. 5), provided with projecting arms 32a, may be secured to the clutch disk 30 and cooperate with a projection 26g on the arm 26c of the clutch member 26. The extent of angular movement of the clutch disk 30 from the normal position, as determined by the stops 32a and 26g, is preferably slightly less than that determined by the stops 46 and 47, so that these latter act solely as safety devices.

There may also be supported from the base 10 auxiliary apparatus useful in connection with many control systems in which my invention is suitable. For example, there may be provided a calibrating slidewire or rheostat 50 operated by a knob 51 and, in case the apparatus is to be used with a network standardized by a standard cell, there may be provided also a standardizing slidewire 52 operated by a knob 53. In this latter instance, a standardizing switch 54 may be supported also from the frame, comprising two pairs of contacts 55 and 56 adapted to be selectively bridged by a member 57 operated by a pushbutton 58. Further, terminals 59, 60 and 61 may be provided for the energizing circuit of the motor M, the circuit of the terminals 43a, and the energizing circuit for the galvanometer coil, respectively. A standard cell 62 may also be included, if desired.

A schematic diagram of a complete control system embodying the apparatus described above is shown in Fig. 7 of the drawings in which corresponding elements have been given the same reference characters as in the preceding figures. The system of Fig. 7 is adapted to maintain constant the average temperature of a furnace 67 heated by an electrical heating element 68 energized from a supply circuit 69 in series with the mercury switch 43. In this instance, the measuring circuit of the galvanometer 15 is connected through the contacts 56 of the switch 54 in series with a thermocouple 66, responsive to the temperature of the furnace 67, and a portion of the slidewire or rheostat 50 provided with an adjustable contact 50a. The slidewire 50 comprises an element of a potentiometer including, also, a fixed resistance 64 in series therewith, energized from a battery 63 through the standardizing slidewire or rheostat 52 having an adjustable contact 52a. The potentiometer circuit may be restandardized by operating the switch 54 to close the contacts 55, thus connecting the galvanometer 15 in series with the standard cell 62 and the potentiometer comprising resistors 50, 64.

It is believed that the operation of the system of Fig. 7 will be readily apparent to those skilled in the art, in view of the foregoing description of the apparatus included therein. In brief, if it be assumed, for example, that, due to change in the input to the furnace 67 or any other cause, the temperature of the furnace rises above normal, the thermoelectromotive force generated by the couple 66 will exceed that of the portion of the resistor 50 included in the galvanometer circuit by the adjustable contact 50a, the galvanometer needle 16 will deflect, and as long as the temperature of the furnace remains above normal, the above-described mechanism will integrate the deflections of the galvanometer needle 16 and impart them to the switch assembly, including the mercury switch 43. As stated above the deflection of the galvanometer needle is always a measure of the departure of the condition from its normal or desired magnitude. As long as there is departure, the needle or pointer 16 remains in a deflected position to produce continuing step-by-step or incremental movement of the switch operating and supporting member 41. Thus within the range of movement of the member 41 the number of steps depends upon the duration of departure of the condition from normal and the length of each step depends upon the instantaneous extent of departure from normal. In case this integrated deflection of the galvanometer needle, that is, the integrated temperature departure from normal, exceeds a predetermined value, the mercury switch 43 will break the circuit at its terminals 43a, thereby deenergizing the heating element 68 of the furnace 67, allowing the furnace to cool. The circuit of the switch 43 will remain open until the integrated departure of the furnace temperature from normal is reduced to zero and/or until the furnace temperature falls below normal for a sufficient length of time, so that the integrated departure of the furnace temperature below normal will be sufficient to return the switch 43 to the position in which the circuit is again completed through its terminals 43a, thus energizing the heating element 68 of the furnace 67.

In the system just described, it is preferable that the heating element 68 should be of such capacity as to heat the furnace to a temperature in excess of the normal value under all operating conditions. As an alternative, it will be well understood by those skilled in the art that the heating element 68, controlled by the switch 43, may be an auxiliary heating element only, in which case the capacity of the main heating element should be less than that required to maintain a proper furnace temperature under any load conditions. It is also understood that the switch 43 may control the operation of any intermediate current controlling devices which, in turn, control the heating element 68, in case the capacity of the switch 43 is inadequate for this purpose.

It will be apparent that the temperature maintained by the control system of Fig. 7 may be adjusted by means of the contact 50a of the resistor 50, which varies the proportion of the electromotive force of the potentiometer which is balanced by that of the thermocouple 66. It will also be apparent that the potentiometer circuit may be restandardized to compensate for the variations in the voltage of the battery 53 by operating the switch 54 to close its contacts 55 and adjusting the contact 52a.

In Fig. 6 is shown a modified switch assembly in which the bracket 41 has two pairs of projecting arms 41a and 41b in planes at an angle to each other. Each of the pairs of arms 41a and 41b is provided with spring clips 42 engaging the mercury switches 43 and 43', respectively. A system utilizing the switch assembly of Fig. 6 is shown diagrammatically, in part, in Fig. 8, which is, in all respects, similar to Fig. 7 with the exception that the furnace 67 is provided with an additional heating element 68' controlled by the auxiliary mercury switch 43'. With such an arrangement, in case the integrated departure of the furnace temperature below normal exceeds a given value, the switch 43 will be operated to energize the heating elements 68, as in the arrangement of Fig. 7. However, if, because of increased load on the furnace 67, the heating element 68 is not sufficient to raise the temperature to the proper value, a further integrated departure of the furnace temperature below normal is effective to operate the switch 43' to energize the heating element 68', thus raising the rate at which heat is supplied to the furnace. In brief, the control of Fig. 7 is merely divided into two steps with the attendant advantages of more accurate control and smaller controlling elements. As in the arrangement of Fig. 7, the switches 43 and 43' may control the operation of any suitable current controlling devices which, in turn, control the heating elements 68 and 68', respectively.

In the system described above, my invention has been illustrated as applied to the control of furnace temperature. However, it will be apparent to those skilled in the art that it is equally applicable to the control of the magnitude of any measurable condition or conditions from which may be derived an electrical effect which is a measure of the condition. Furthermore, it will be apparent that in the systems of my invention, by integrating the departure of the magnitude of a condition from its normal value and applying a correction to the condition until the integrated departure is reduced to zero, the average condition over a period of time is accurately maintained at the desired value, which may be either constant, as in the systems illustrated, or variable, according to a predetermined law, by properly controlling the adjustable contact 50a of the calibrating resistor 50.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim is:

1. An electric control system comprising an element movable from a neutral position solely in response to departure of the magnitude of a condition from a desired value, means for integrating movements of said element from neutral position including a pivotally mounted driven member operable by continuing step-by-step movements, the number of steps depending upon the duration, and the length of each step depending upon the extent, of said departure of said condition from said predetermined value, a gravity-operated electric switch mounted on said driven member and having a pair of contacts the circuit controlling condition of which is changed only in response to integrated movement of said driven member through a predetermined angle, and a circuit controlled solely by said contacts for controlling said condition.

2. An electric control system comprising an element movable from a neutral position solely in response to departure of the magnitude of a condition from a desired value, means for integrating movements of said element from neutral position including a pivotally mounted driven member operable by continuing step-by-step movements, the number of steps depending upon the duration, and the length of each step depending upon the extent, of said departure of said condition from said predetermined value, a mercury switch mounted on said driven member, and a circuit controlled solely by said mercury switch for controlling said condition.

3. An electric control system comprising an element movable from a neutral position solely in response to departure of the magnitude of a condition from a desired value, means for integrating movements of said element from neutral position including a pivotally mounted driven member operable by continuing step-by-step movements, the number of steps depending upon the duration, and the length of each step depending upon the extent, of said departure of said condition from said predetermined value, a pair of mercury switches mounted on said driven member with an angular displacement therebetween, a circuit controlled solely by one of said switches for controlling said condition in a given manner, and a circuit controlled solely by the other of said switches for controlling said condition in a different manner.

4. An electric control system comprising an element movable from a neutral position solely in response to departure from normal of a condition to be controlled, means for integrating movements of said element from neutral position including a pivotally mounted driven member operable by continuing step-by-step movements, the number of steps depending upon the duration, and the length of each step depending upon the extent, of said departure of said condition from said predetermined value, a mercury switch mounted on said driven member and operable to close its contacts only in response to a predetermined integrated departure of said condition from normal, and a circuit controlled solely by said mercury switch for controlling means to restore said condition to normal.

5. An electric control system comprising an element movable from a neutral position solely in response to departure from normal of a condition to be controlled, and returnable to said neutral position only after return of said condition to its normal magnitude, means for integrating movements of said element from neutral position including a pivotally mounted driven member, a pair of mercury switches mounted on said driven member with an angular displacement therebetween and operable to close their respective contacts only in response to different predetermined integrated departures of said condition from normal, a circuit controlled solely by that one of said switches operable in response to the lesser integrated departure of said condition from normal for controlling means to restore said condition to normal at a predetermined rate, and a circuit controlled by the other of said switches for controlling means to restore said condition to normal at a higher rate.

6. An electric control system comprising an element movable from a neutral position solely in response to departure from a normal magnitude of a condition to be controlled, means for integrating movements of said element from neutral position including a pivotally mounted driven member, a gravity operated electric switch mounted on and operable by movement of said driven member and having a pair of contacts the circuit controlling condition of which is changed only in response to a predetermined integrated departure of said condition from normal, stop mechanism for limiting the angular movement of said driven member, and a circuit controlled solely by said contacts for controlling said condition.

7. A control system comprising a balanceable network unbalanced by departure of a condition from a desired magnitude and remaining unbalanced until return of said condition to said desired magnitude, an element movable from a neutral position solely in response to unbalance of said network, and returnable to said neutral position only after the magnitude of said condition is again at said desired magnitude and said network is balanced, mechanism intermittently engaging said element and deflectable in accordance with movement thereof, a driven member, a driving member normally engaging said driven member, means for intermittently disengaging said driving and driven members, said driving member when disengaged being movable from a neutral position by and in accordance with movement of said engaging mechanism, means for periodically returning said driving member to neutral position while engaging said driven member periodically to move said driven member by amounts dependent upon the extent of departure of said condition from its desired magnitude, and a control device directly operable by a predetermined integrated movement of said driven member for controlling the magnitude of said condition.

DANIEL J. LANE.